Aug. 20, 1946.  H. W. GOFF  2,406,012
MECHANICAL DRIVE DEVICE
Filed Sept. 30, 1943  2 Sheets-Sheet 1
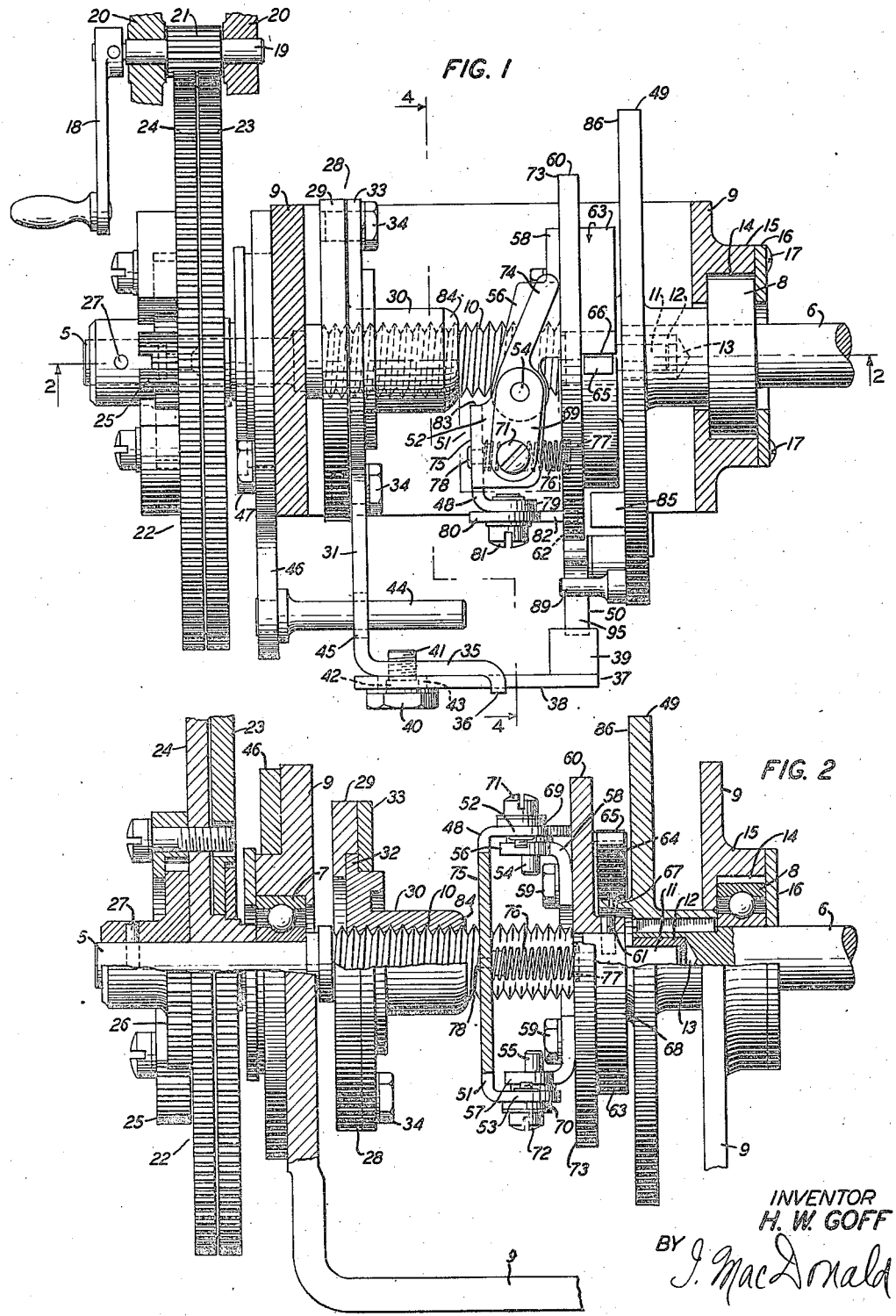
INVENTOR
H. W. GOFF
BY J. MacDonald
ATTORNEY Aug. 20, 1946.  H. W. GOFF  2,406,012
MECHANICAL DRIVE DEVICE
Filed Sept. 30, 1943  2 Sheets-Sheet 2

INVENTOR
H. W. GOFF
BY J. MacDonald
ATTORNEY

Patented Aug. 20, 1946

2,406,012

UNITED STATES PATENT OFFICE 2,406,012

MECHANICAL DRIVE DEVICE

Harold W. Goff, Manhasset, N. Y., assignor to Bell Telephone Laboratories, Incorporated, New York, N. Y., a corporation of New York Application September 30, 1943, Serial No. 504,389

4 Claims. (Cl. 74—84)

This invention relates to mechanical drive devices and more particularly to mechanical drive devices operable as a drive connecting means between a driven apparatus and another apparatus to be driven.

The object of the invention is to provide a mechanical drive device suitable for use as a driving means between a driving shaft and a shaft to be driven, the second mentioned shaft being operated during only portions of the time the driving shaft is operated.

Features of the invention reside in a clutch operable to drive connect two members at one point, a dog to connect the two members at another point, a trigger to control the dog and a traveler carried by and movable along one of the members and carrying means to control the operation of the clutch and trigger.

Another feature resides in a spring means operating to hold one of the members in a required position while another member is being operated.

In the drawings:

Fig. 1 is a side elevational view, partly in section, of the mechanical drive device;

Fig. 2 is a plan view, partly in section, of the mechanical drive device viewed from below Fig. 1 and with certain parts omitted to permit a better view of some of the other parts;

Figure 3:
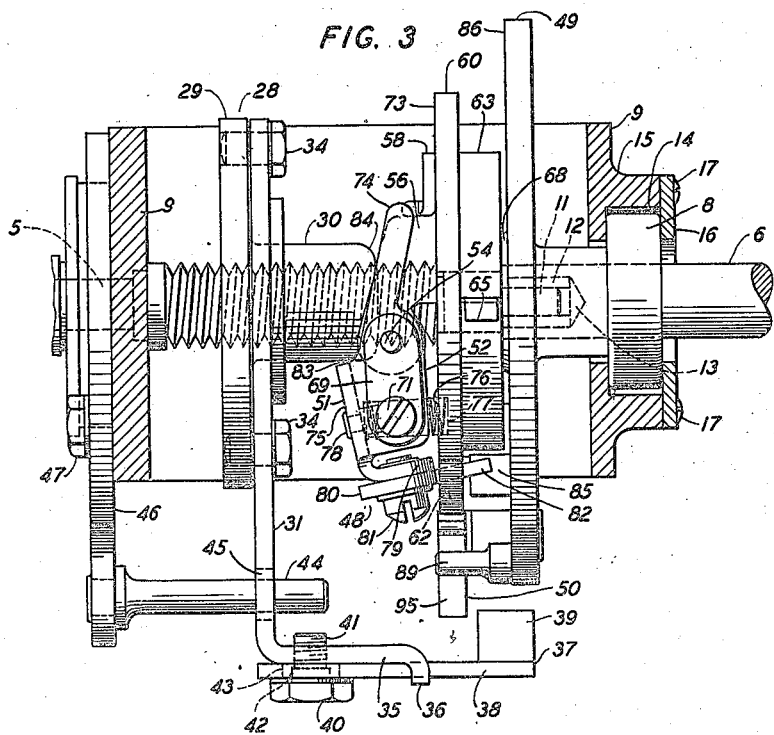
Figure 4:
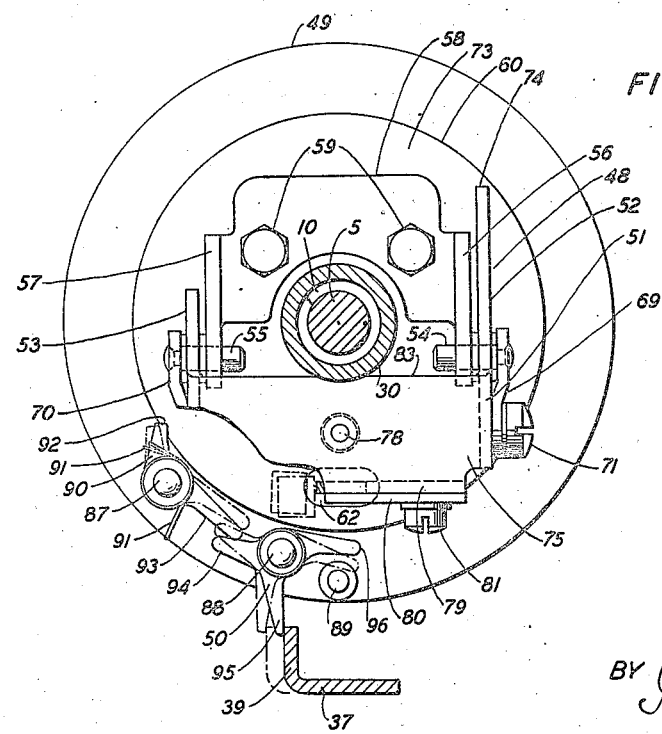

Fig. 3 corresponds in general to Fig. 1 but shows some of the parts moved to different positions; and Fig. 4 is an end view, partly in section, of the mechanical drive device taken on the lines 4—4 in Fig. 1.

In certain apparatus operable to determine the location of a target relative to an observing station and to compute in electrical values the location of the target, it is found advantageous to have a means for mechanically driving an electrical device in a computer during only a portion of the time a target locating means is being operated to locate the target, the target locating apparatus being operated during the entire time the target is being observed and the computer being operated only when the target is within predetermined distances from the observing station.

As an example, and not in the sense of limiting the invention, the apparatus for locating the target may be operable to locate the target when the target is 40,000 yards from and approaching the observing station and the computer should be operated only during the time the target is within 28,000 yards of the observing station. Under this condition it is found advantageous to have a mechanical drive device operable to drive connect the target observing apparatus to the computer apparatus only when the target is within 28,000 yards of the observing station.

The present invention provides a mechanical drive device which may be used as a mechanical driving means between a driven member in a driving means and a member to be target observing apparatus and a member to be driven in an electrical computer apparatus. The device contains certain parts which may be adjusted to change the range factor of the mechanical drive device.

As shown in Figs. 1, 2 and 3, in the drawings the mechanical drive device comprises two longitudinally aligned rotatable shafts 5 and 6 supported in low friction type bearings 7 and 8, respectively, which are supported in a stationary U-shaped body 9. The shaft 5 has a left-hand male threaded portion 10 and one end of the shaft 5 is reduced in diameter as shown at 11 to project into a bearing 12 mounted in a recess 13 formed in one end of the shaft 6. The bearing 8 is located in a recess 14 formed in a boss 15 of the body 9 and is retained in place by means of a flange 16 secured on the outer end of the boss 15 by means of screws 17.

The shaft 5 may be rotated through the operation of any suitable means and which may be, for instance, a crank 18 operable to turn a shaft 19 and which may be part of a rotating mechanism in a target observing apparatus, not shown. The shaft 19 is shown as being rotatably supported in stationary supports 20—20 and is equipped with a pinion 21 in mesh with an anti-back lash gear system 22 comprising two gear wheels 23 and 24 mounted in face to face relation on the shaft 5 and gears 25 and 26, the latter of which is secured by means of a pin 27 to the shaft 5. Since the present invention does not reside in the anti-back lash gear system shown and other anti-back lash gear systems may be used in place thereof, it seems unnecessary to include in this specification a detail description of the parts of the anti-back lash system shown in the drawings. It will be understood, however, that the anti-back lash gear system is provided to prevent back lash between the rotation of the pinion 21 and the shaft 5.

Supported on the shaft 5 and operable therealong by means of the thread on the male threaded portion 10 is a traveler 28 comprising a ring 29, a flanged hub 30 and an L-shaped arm 31. The hub 30 is internally threaded to receive the threaded portion 10 of the shaft 5 and the flanged body 32 of the hub 30, as shown in Fig. 2, is clamped to the ring 29 by means of a body portion 33 of the arm 31 and screws 34—34. The body portion 33 of the arm 31 is substantially annular in form and is apertured to receive the shank portions of the screws 34—34 which enter tapped holes formed in the ring 29. The flanged body 32 of the hub 30 is entered in a recess formed in the ring 29 and is held in place by means of the body portion 33 of the arm 31 when the screws 34—34 are tightened. The arm 31 extends radially of the shaft 5 and near its outer end is bent to provide an angularly extending end portion 35 which extends in parallel spaced relation with the shaft 5 and terminates in two spaced lugs 36—36 only one of which is visible in the drawings, the lug not visible being directly under the one shown in Figs. 1 and 3. The end portion 35 on the arm 31 serves as a support for a tripper bar 37 which is adjustably supported on the end portion 35 of the arm 31. The tripper bar 37 comprises a flat bar portion 38 and a plate portion 39 which extends inwardly toward the shaft 5. The bar portion 38 is secured to the outer surface of the end portion 35 of the arm 31 by means of a screw 40, the threaded shank 41 of which is engaged in a tapped hole formed in the end portion 35. The shank of the screw 40 is enlarged at 42 and an elongated aperture 43 is provided in the bar portion 38 to accommodate the portion 42 of the screw 40. The elongated aperture 43 is longer than the diameter of the portion 42 of the screw 40 so that when the screw 40 is loosened the tripper bar 37 may be adjusted lengthwise along the end portion 35 of the arm 31. Part of the bar portion 38 of the tripper bar 37 extends between the spaced lugs 36—36 to prevent pivoting of the tripper bar 37 on the screw 40.

To prevent the traveler 28 from turning on the shaft 5 a post 44 is provided which extends in parallel spaced relation with the shaft 5 and through an aperture 45 in the arm 31. The post 44 is mounted at one end in a frame 46 secured by means of screws 47 to one end of the body 9. When the shaft 5 is rotated the traveler 28 is moved along the shaft 5 due to the turning of the male threaded portion 10 of the shaft 5 in the hub 30 which is held against rotation by means of the arm 31 and the post 44. Rotation of the shaft 5 in one direction causes movement of the traveler 28 in one direction along the shaft 5. By reversing the rotation of the shaft 5 the traveler 28 may be returned along the shaft 5 to its original starting position.

The traveler 28 performs two functions, one of which is to operate a clutch device 48 part of which is mounted on and rotatable with the shaft 5. Another part of the clutch device 48 comprising a wheel 49 which is secured to the shaft 6. When the clutch device 48 is operated in one direction, it serves as a means to, in effect, drive connect the shaft 5 to the shaft 6 for rotation of the shaft 6 in one direction. The other function of the traveler 28 is to carry the plate 39 into and out of engagement with a trigger 50 to control the operation of the trigger 50, the function of which will be subsequently explained.

The clutch device 48 comprises a rocker 51 having side members 52 and 53 through which pins 54 and 55 respectively extend, the pins 54 and 55 being also extended through apertures in the side members 56 and 57 of a yoke type bracket 58, the bracket 58 being secured by means of screws 59—59 to a disc 60 which is mounted on the shaft 5 and secured thereto by means of a pin 61.

The disc 60 is apertured at 62 to permit thrusting therethrough of a part of the clutch device 48 and is provided with an annular boss 63 in which is housed a partially wound-up wind-up spring 64 the outer end 65 of which is extended through a slot 66 in the boss 63 and bent over the outer surface of the boss 63 to anchor one end of the spring 64 to the disc 60. The inner end of the spring 64 is secured by means of a rivet 67 to an annular boss 68 on the wheel 49. The purpose of the spring 64 will be subsequently explained. The pins 54 and 55 are mounted in apertured bars 69 and 70 respectively which are secured by means of the respective screws 71 and 72 to the side members 52 and 53 respectively of the rocker 51. Since the pins 54 and 55 extend through about the central portions of the side members 52 and 53 respectively of the rocker 51 and through the corresponding side members 56 and 57 of the yoke 58 the rocker 51 is pivotally supported and may be rocked relative to the inner face 73 of the disc 60. The side member 52 of the rocker 51 is considerably extended in one direction from the pivotal point of support of the rocker 51 to provide a finger 74 which will engage the inner face 73 of the disc 60 to limit the extent of rocking movement of the rocker 51 in one direction. Connecting the side members 52 and 53 of the rocker 51 and extending from one end of the rocker 51 is a wall 75 which extends in spaced relation with the inner face 73 of the disc 60. A helical spring 76 is located between the inner face of the wall 75 and the inner face 73 of the disc 60, one end of the spring 76 being disposed in a recess 77 formed in the inner face 73 of the disc 60 and the other end of the spring 76 being telescoped over an extended end portion of a rivet 78 secured to the wall 75 and extending toward the inner face 73 of the disc 60. The spring 76 normally urges the rocker 51 into such position that the finger 74 engages the inner face 73 of the disc 60 as shown in Fig. 1. The wall 75 is continued over and slightly beyond one end of the rocker 51 to provide an end wall 79 extending toward the inner face 73 of the disc 60. A T-shaped bar 80 is adjustably mounted on the end wall 79 by means of screws 81—81 only one of which is shown, the screws 81—81 extending through relatively large apertures formed in the cross member of the bar 80 and into screw threaded engagement with the end wall 79. The stem 82 of the bar 80 extends into the aperture 62 formed in the disc 60.

As shown in Fig. 1 the upper end 83 of the wall 75 normally extends into the path of movement of the hub 30 of the traveler 28 and the forward end of the hub 30 is bevelled at 84 so that when the traveler 28 is moved forwardly along the shaft 5 the upper edge 83 of the wall 75 will be, in effect, cammed by the bevelled portion at 84 to rock the rocker 51 on its pivotal points of support and against the action of the helical spring 76, the result being that the stem 82 of the T-shaped bar 80 is projected a considerable distance through the aperture 62 in the disc 60 and to the position shown in Fig. 3. Since the disc 60 as above mentioned is secured to the shaft 5 and the rocker 51 is mounted on the yoke 58 which is secured to the disc 60, the rocker 51 is rotated when the shaft 5 is rotated. When the stem 82 of the bar 80 is in the position shown in Fig. 3 a block 85 supported on the inner face 86 of the wheel 49 is in the circular path of movement of the stem 82. Upon engagement of the stem 82 with the block 85 and continued rotation of the shaft 5 the wheel 49 and the shaft 6 to which the wheel 49 is secured are rotated in the same direction as the shaft 5. It will be seen, therefore, that the clutch device 48 operates, in effect, to drive connect the driven shaft 5 to the shaft to be driven which in this case is the shaft 6.

Supported on the inner face 86 of the wheel 49 and extending over and in spaced relation with the outer edge of the disc 60 are two spaced pins 87 and 88 and a stud 89 as shown in Fig. 4. A dog 90 equipped with a spring 91 is pivotally supported on the pin 87 and arranged to engage a notch 92 formed in the outer edge of the disc 60, the dog 90 being operated by means of the spring 91 to engage the notch 92. A finger 93 is provided on the dog 90 and arranged to be engaged by a finger 94 on the trigger 50 to release the dog 90 from engagement with the notch 92, the trigger 50 being pivotally supported on the pin 88 and having in addition to the finger 94, a finger 95 to be engaged by the plate 39 and a finger 96 to engage the stud 89, the finger 96 and the stud 89 serving in cooperation as a stop to limit rotation of the trigger 50 on the pin 88 in one direction.

To explain the operation of the mechanical drive device above described and not in the sense of limiting its use thereto, it will be assumed that the shaft 5 is connected to some target observing means, not shown, and the shaft 6 is connected to a rotatable wiper contact means in a potentiometer employed in an electrical computer. Also, that the shaft 6 has been rotated to bring the wiper contact means to a stop provided at one end of travel of the wiper contact means over a resistance winding, the spring 64 has been partly wound up to hold the wheel 49 and the shaft 6 against such movement as would cause the wiper contact means in the potentiometer to be moved away from the stop and it is desired to rotate the shaft 5 to operate the target observing means over its range of movement. It will also be assumed that during a first part of this range of movement, it is necessary to rotate the shaft 5 in a right-hand turning movement without causing corresponding rotation of the shaft 6 and that when the target observing means has been operated over part of its range of movement and is continued in operation in the same direction and into a predetermined range of movement for the potentiometer in the electrical computer, it is necessary that the shaft 6 be rotated in the same direction as the shaft 5.

Under the conditions mentioned above the parts of the mechanical drive device will be initially in the positions shown in Figs. 1 and 2. In this case the traveler 28 is in such position that the hub 30 is not in engagement with the rocker 51, the stem 82 is retracted into the aperture 62 in the disc 60 and entirely clear of the block 85 on the wheel 49 and the plate 39 on the tripper bar 37 is bearing against the finger 95 of the trigger 50 so that the trigger 50 and the dog 90 are in the dot-dash line positions shown in Fig. 4. The dog 90 is therefore held out of engagement with the notch 92 against the action of the spring 91. By operating the crank 19 in the required direction the shaft 5 may be rotated in a right-hand turning movement. During the first part of this turning movement the energy stored in the spring 64 urges the wheel 49 against a right-hand turning movement thereof and keeps the finger 95 of the trigger 50 so pressed against the plate 39 of the tripper bar 37 that the trigger 50 holds the dog 90 out of engagement with the notch 92.

The disc 60, therefore, is not drive connected to the wheel 49 and the wheel 49 and shaft 6 are held by means of the energy stored in the spring 64 against right-hand turning movements which might otherwise occur through slight frictional coupling of the parts. The wiper contact in the potentiometer in the electrical computer will therefore be held against movement from its starting position until the shaft 6 is properly turned. A continued right-hand turning movement applied to the shaft 5 will bring the traveler 28 into such position that the bevelled portion 84 on the hub 30 will engage the edge 83 of the wall 75 on the rocker 51. By engagement of these parts the rocker 51 will be rocked on its pivotal point of support so that the spring 76 will be compressed and the stem 82 of the bar 80 will be projected toward the inner face 86 of the wheel 49. The tripper bar 37 will also be moved so that the plate 39 will be almost out of engagement with the trigger 50. Still further rotation of the shaft 5 in the same direction will cause the hub 30 to become more fully in engagement with the edge 83 of the wall 75 and will carry the tripper bar 37 to such position that the plate 39 will not be in engagement with the trigger 50. The stem 82 of the bar 80 will also be carried further through the aperture 62 and nearer to the inner face 86 of the wheel 49. When the parts have been moved to the positions last described and are in the position shown in Fig. 3 further right-hand turning movements of the shaft 5 will be transmitted to the shaft 6 so that the shaft 6 will be rotated in a right-hand turning movement corresponding to the movement of the shaft 5, the disc 60 and the wheel 49 being, in effect, drive connected at two points, one being the engagement of the stem 82 of the bar 80 against the block 85 on the wheel 49 and the other being engagement of the dog 90 on the wheel 49 with the notch 92 in the disc 60.

With the parts in the positions shown in Fig. 3 and upon rotation of the shaft 5 in a left-hand rotational movement the following changes in the operations of the parts will take place in the order mentioned.

1. The left-hand rotating movement applied to the shaft 5 will be transmitted to the shaft 6 since the dog 90 is in engagement with the notch 92.
2. The traveler 28 will be moved back along the shaft 5 by means of the threaded portion 10 on the shaft 5.
3. The trigger 50 will be carried around by the wheel 49.
4. The plate 39 on the tripper bar 37 will be moved into the path of movement of the trigger 50 which is being carried around on the wheel 49. At this stage the hub 30 will be in such position relative to the rocker 51 that the edge 83 of the wall 75 is almost on the bevelled portion 84 of the hub 30.
5. Engagement of the trigger 50 with the plate 39 will stop further left-hand rotations of the wheel 49 and the shaft 6. It will also cause operation of the trigger 50 to release the dog 90 from engagement with the notch 92 in the disc 60.
6. Continued rotation of the shaft 5 in the same direction will cause the hub 30 of the traveler 28 to be removed from engagement with the wall 75 of the rocker 51 thereby allowing the rocker 51 to be rocked back to normal position by means of the spring 76 and so that the stem 82 of the bar 80 is retracted into the aperture 62 in the disc 60.
7. Further rotation of the shaft 5 in the same direction will cause the disc 60 to be rotated to wind up the spring 64, which was partially unwound, the winding up of the spring 64 starting immediately after the wheel 49 is stopped against further rotation.

8. The spring energy developed in the spring 64 operates to prevent the wheel 49 and shaft 6 from rotating in a right-hand turning movement from their stopped position so that the wiper contact of the potentiometer will remain at the stop position. The spring energy also holds the trigger 50 against the plate 39 of the tripper bar 37 to hold the dog 90 out of the notch 92.

9. The shaft 5 may be continued in rotation in the same direction until the traveler 28 is returned to the position shown in Fig. 1 or until the ring 29 engages the end of the body 9.

It will be seen by looking at Fig. 1 that the number of turns of the shaft 5 required to move the traveler 28 along the shaft 5 to such position that it will engage and rock the rocker 51 to cause the rotations of the shaft 5 to be transmitted to the shaft 6 depends on the pitch of the screw thread on the male threaded portion 10 of the shaft 5, the distance the hub 30 of the traveler 28 is from the rocker 51 at the beginning of the turning movement of the shaft 5 and the distance the free end of the stem 82 of the bar 80 is from the block 85 at the beginning of the operation. The aperture in the bar 80 provided for accommodation of the shank of the screw 81 is larger than the diameter of the shank of the screw so that upon loosening the screw 81 the bar 80 may be moved longitudinally to change the distance the stem 82 is from the block 85. The mechanical drive device may therefore be adjusted so that when a certain predetermined number of turns is applied to the shaft 5 the shaft 5 will be turned without transmitting the turning movement to the shaft 6 and when the predetermined number of turns have been made and the shaft 5 is continued in rotation, the turning movement of the shaft 5 will be transmitted to the shaft 6. The tripper bar 37 may also be adjusted longitudinally to make the plate 39 trip the trigger 50 or move out of the way of the trigger 50 at certain predetermined times during the forward and backward movements of the traveler 28.

When the mechanical drive device is used as a drive connecting means between a target observing means and a potentiometer in an electrical computer and it is required that the target observing means be operable over a certain predetermined part of its range without operating the potentiometer and the potentiometer is then to be operated when the target observing means is continued in operation for the balance of its range, the shaft 5 may be so connected to the target observing means that it will be rotated when the target observing means is swept over a certain range. The wiper arm of the potentiometer in the electrical computer may be so connected to the shaft 6 that the wiper arm will be rotated when the shaft 6 is rotated. The adjustable parts of the mechanical drive device may then be adjusted so that when the shaft 5 is rotated a predetermined number of turns corresponding to a predetermined part of the range of the target observing means and the target observing means is continued in operation in the same direction the mechanical drive device will be effective to, in effect, couple or uncouple the shaft 5 with respect to the shaft 6.

What is claimed is:

1. A mechanical drive device, operable as a means for drive connecting a first rotatable shaft to a second rotatable shaft in accordance with a predetermined program requiring that the first shaft shall be rotated a predetermined number of turns while the second shaft is held stationary and the second shaft shall be rotated in accordance with only some of the rotational movements of the first shaft, and comprising a first rotatable shaft, means to rotate said shaft, a second rotatable shaft, an apertured rotatable member secured to said first shaft, a block-equipped rotatable member secured to said second shaft, said rotatable members being supported by means of said shafts in spaced relation, a rocker mounted on said apertured rotatable member, a stem on one end of said rocker and extending into the aperture provided in said apertured rotatable member, a screw thread on said first shaft and a traveler supported on said first shaft in screw threaded engagement with said screw thread and operable by means of said first shaft to move along said first shaft and rock said rocker so that said stem will engage the block on said block-equipped rotatable member to transmit rotations of said first shaft to said second shaft.

2. A mechanical drive device, operable as a means for drive connecting a first shaft to a second shaft to be driven in accordance with a predetermined program requiring that the first shaft shall be rotated a predetermined number of turns while the second shaft is held stationary and the second shaft shall be rotated in accordance with further rotations of the first shaft, and comprising a first rotatable shaft, means to rotate said first shaft, a second rotatable shaft, a rotatable member secured to said second shaft, means supporting said shafts, a clutch device comprising a rocker carried by said first shaft, a stem on said rocker and a block projecting from said rotatable member, a traveler supported on and movable along said first shaft, screw threaded means on said first shaft and on said traveler to cause movement of said traveler along said first shaft when said first shaft is rotated, said traveler being operable to rock said rocker to move said stem into position to engage said block during part of the rotatable movement of said first shaft and said clutch device operating to transmit rotations of said first shaft to said second shaft when said stem is in engagement with said block.

3. A mechanical drive device comprising a rotatable shaft, means operable to rotate said shaft, a screw thread on said shaft, a traveler supported on said shaft and driven along said shaft by means of said screw thread, means holding said traveler against rotation, an apertured disc secured to said shaft and spaced from said traveler, a rocker supported on said disc in the path of movement of said traveler, a stem supported on said rocker and projectable through the aperture in said disc, a second rotatable shaft, means to support said second shaft, a wheel secured to said second shaft, a block on said wheel to be engaged by said stem, a pivoted dog and a trigger for said dog supported on said wheel, said dog and trigger extending over an edge of said disc, said dog being operable against said disc to prevent said wheel from being rotated relative to said disc, a tripper bar supported on said traveler and engageable with said trigger to trip said trigger to release said dog from said disc, said traveler being operable to rock said rocker to bring said stem into position to engage said block to transmit rotations of the first mentioned shaft to said second shaft, and said device being operable to permit the first mentioned shaft to be rotated a predetermined number of turns without causing said second shaft to be rotated and then upon continued rotation of the first mentioned shaft to, in effect, couple the first mentioned shaft to said second shaft.

4. A mechanical drive device comprising a support, an externally threaded driving shaft supported in said support, means to rotate said shaft, a second rotatable shaft supported in alignment with said driving shaft, means to support said second shaft, an apertured rotatable member secured to said driving shaft, a second rotatable member secured to said second shaft, a block on said second rotatable member, said rotatable members being supported in parallel spaced relation, a partially wound up wind-up spring located between said rotatable members, one end of said spring being secured to said apertured rotatable member and the other end being secured to said second rotatable member, a rocker supported on said apertured rotatable member, a stem on said rocker extending through the aperture in said apertured rotatable member and operable by means of said rocker to project into the space between said rotatable members, a return spring in said rocker, a notched portion on said apertured rotatable member, a dog and a trigger pivotally supported on said second rotatable member and extending over the notched portion of said apertured rotatable member, said dog being operable to engage in the notch on said notched portion and said trigger being operable to release said dog from said notched portion, a traveler supported on said driving shaft and in screw threaded engagement with said driving shaft, a post supported on said support and operating to prevent rotation of said traveler, said traveler being operable along said driving shaft to engage and rock said rocker to project said stem into the space between said members to a position to engage said block when said members are relatively rotated, a tripper bar supported on said traveler and carried by means of said traveler into and out of engagement with said trigger, said device being operable, when said driving shaft is rotated in one direction, to allow said driving shaft to rotate without rotating said second shaft and then later operating to drive connect said driving shaft to said second shaft by engagement of said stem with said block, said tripper operating to permit said dog to engage said notched portion to prevent relative rotation of said members, and said device being operable when a reverse rotation is applied to said driving shaft to at first have both shafts rotate, then later trip said trigger by means of said tripper bar to release said dog from said notched portion and stop said second shaft, then move said traveler away from said rocker to allow said stem to be withdrawn from the space between said members, said apertured member being then rotated by further rotations of said driving shaft to further wind-up said wind-up spring to hold said second rotatable member and said second shaft against movement from their stopped position.

HAROLD W. GOFF.